(12) United States Patent
Sasada et al.

(10) Patent No.: US 9,559,448 B2
(45) Date of Patent: Jan. 31, 2017

(54) BOARD EDGE CONNECTOR

(71) Applicant: Hosiden Corporation, Yao-shi (JP)

(72) Inventors: Kosuke Sasada, Yao (JP); Takayuki Nagata, Yao (JP)

(73) Assignee: Hosiden Corporation, Osaka (JP)

( * ) Notice: Subject to any disclaimer, the term of this patent is extended or adjusted under 35 U.S.C. 154(b) by 95 days.

(21) Appl. No.: 14/156,063

(22) Filed: Jan. 15, 2014

(65) Prior Publication Data

US 2014/0220812 A1    Aug. 7, 2014

(30) Foreign Application Priority Data

Jan. 17, 2013  (JP) ................. 2013-006577
Jan. 17, 2013  (JP) ................. 2013-006578
Jan. 17, 2013  (JP) ................. 2013-006579
Jan. 17, 2013  (JP) ................. 2013-006580

(51) Int. Cl.
  *H01R 13/62*    (2006.01)
  *H01R 12/72*    (2011.01)
  *G06K 7/00*     (2006.01)
  *H01R 12/83*    (2011.01)

(52) U.S. Cl.
  CPC ............ *H01R 12/721* (2013.01); *G06K 7/003* (2013.01); *H01R 12/83* (2013.01)

(58) Field of Classification Search
  CPC ............. H01R 23/682; H01R 23/7005; H01R 23/7068; H01R 23/6873; H01R 13/65802
  USPC ................................................. 439/326, 328
  See application file for complete search history.

(56) References Cited

U.S. PATENT DOCUMENTS

| | | | |
|---|---|---|---|
| 5,288,247 A * | 2/1994 | Kaufman | G06K 7/0047 439/101 |
| 5,451,168 A | 9/1995 | Shuey | |
| 5,478,247 A * | 12/1995 | Chen et al. | 439/65 |
| 5,641,295 A | 6/1997 | Koyama | |
| 6,176,725 B1 | 1/2001 | Kobayashi et al. | |
| 6,413,109 B1 | 7/2002 | Kobayashi et al. | |
| 6,881,085 B2 * | 4/2005 | Yahiro et al. | 439/326 |
| 7,048,589 B2 * | 5/2006 | Bricaud et al. | 439/630 |
| 7,074,067 B2 * | 7/2006 | Yang et al. | 439/326 |
| 7,175,461 B1 * | 2/2007 | Ju | 439/326 |

(Continued)

FOREIGN PATENT DOCUMENTS

| | | |
|---|---|---|
| JP | 8190967 A | 7/1996 |
| JP | 8250238 A | 9/1996 |

(Continued)

*Primary Examiner* — Hien Vu
(74) *Attorney, Agent, or Firm* — The Webb Law Firm

(57) ABSTRACT

A board edge connector to which a board is inserted along an oblique direction relative to its fixed posture includes a main body, a plurality of contacts arranged in juxtaposition on the main body along a direction perpendicular to an insertion direction of the board, and a cover member covering the main body. The main body includes a base portion on which the multiple contacts are juxtaposed and a pair of arm portions extending from the base portion along opposed lateral edges of the board which assumes a fixed posture. The cover member includes an attaching portion covering the base portion and a pair of arm members covering lateral faces of the pair of arm portions, the pair of arm members being formed integral with the attaching portion.

11 Claims, 8 Drawing Sheets

(56) References Cited

U.S. PATENT DOCUMENTS

| | | | |
|---|---|---|---|
| 7,789,692 B2* | 9/2010 | Lee | H01R 13/6275 |
| | | | 439/327 |
| 8,021,178 B1 | 9/2011 | Lee et al. | |
| 8,251,726 B2* | 8/2012 | Ma | 439/326 |
| 8,465,314 B2 | 6/2013 | Kato | |
| 8,608,504 B2* | 12/2013 | Tseng | H01R 9/034 |
| | | | 439/326 |
| 2012/0190217 A1 | 7/2012 | Tseng | |

FOREIGN PATENT DOCUMENTS

| | | | |
|---|---|---|---|
| JP | 9505915 A | 6/1997 |
| JP | 1116646 A | 1/1999 |
| JP | 200058198 A | 2/2000 |
| JP | 2000208183 A | 7/2000 |
| JP | 2000306621 A | 11/2000 |
| JP | 3117605 U | 1/2006 |
| JP | 3163627 U | 10/2010 |
| JP | 2012142146 A | 7/2012 |

* cited by examiner

BOARD EDGE CONNECTOR

CROSS-REFERENCE TO RELATED APPLICATIONS

This application claims priority to Japanese Patent Application Nos. 2013-006577, 2013-006578, 2013-006579, and 2013-006580, all filed Jan. 17, 2013, the disclosures of which are incorporated herein by reference in their entirety.

BACKGROUND OF THE INVENTION

Field of the Invention

The present invention relates to a board edge connector to which a board is inserted along an oblique direction relative to its fixed posture.

Description of the Related Art

An example of the above-described board edge connector (to be referred to simply as "edge connector" hereinafter) is known from the Japanese Utility Model Registered No. 3117605. This edge connector is fixed as a pair of retaining members having a function of engaging portions or elastic pieces are inserted to slits of a pair of guide arms.

However, with such edge connector above, it is necessary to provide a fixing mechanism for fixing the retaining members to the guide arms. So, there is possibility of increase of the size of the connector. This becomes problematic in particular in case the number of contacts is small.

The present invention has been made in view of the above-described issue. One object of the invention is to provide a compact board edge connector.

Further, as another example of the edge connector described above is known from the Japanese Unexamined Patent Application Publication No. 8-250238. This edge connector includes a guide member for allowing insertion of a board at a predetermined angle. When the board is to be retained by being pressed down, the guide member is pivoted downwards by an elastic force to a board mounting surface to be fixed.

However, with this edge connector, the board is fixed with the guide member being kept elastically deformed. Hence, when the fixed state continues, there is possibility of resilience of the guide member being lost. In such case, guiding of the board at the predetermined angle becomes impossible, so that the edge of the board may come into contact with the contacts, thus damaging them.

The present invention has been made in view of the above-described issue also. Another object of the invention is to provide a board edge connector capable of preventing damage to the contacts at the time of insertion of the board.

Further, another example of the above edge connector is known from the Japanese Unexamined Patent Application Publication No. 8-250238, which includes retaining portions for preventing spring-up phenomenon of the board. These retaining portions are provided in a pair of arm portions. In operation, when the board is pressed into the fixed posture, the edge of the board comes into contact with the upper faces of the retaining portions, thus spreading these retaining portions apart to the right and left sides. And, under the fixed state of the board, the lower faces of the retaining portions contact the upper face of the board for preventing its spring-up.

However, with such edge connector as above, although the spring-up phenomenon is prevented as the board is fixed from its upper face by the retaining portions, there is possibility of inadvertent withdrawal or detachment of the board.

The present invention has been made in view of the above-described issue also. Still another object of the invention is to provide a board edge connector capable of effecting restriction of float-up of the board and restriction of withdrawal at a same time.

Further, still another example of the edge connector described above is known from the Japanese Unexamined Patent Application Publication No. 11-16646. In this edge connector, a pair of arms are provided with fixing pieces that are to be fixed to a mount board by e.g. soldering. Further, the arms include retaining pieces disposed adjacent the fixing pieces for retaining the board. At the time of fixing of the board, the edge of the board will be brought into contact with the upper faces of the retaining pieces to push them apart from each other.

However, with such edge connector above, in the course of the pressing operation of the board or the retention is released by pressing the retaining pieces apart from each other to the left and right sides, the contacts may be inadvertently detached from the mount board due to the leverage with the fixing pieces acting as pivots.

The present invention has been made in view of the above-described issue also. Still another object of the invention is to provide a board edge connector having high resistance against removal from the mount board.

SUMMARY OF THE INVENTION

According to one embodiment of a board edge connector relating to the present invention, the board edge connector comprises:

a main body;

a plurality of contacts arranged in juxtaposition on the main body along a direction perpendicular to an insertion direction of a board; and a cover member covering the main body;

wherein the main body includes a base portion on which the multiple contacts are juxtaposed, and a pair of arm portions extending from the base portion along opposed lateral edges of the board which assumes a fixed posture; and the cover member includes an attaching portion covering the base portion and a pair of arm members covering lateral faces of the pair of arm portions, the pair of arm members being formed integral with the attaching portion.

According to one preferred embodiment of the inventive board edge connector, the attaching portion includes an attaching face that covers an upper face of the base portion, and there is formed an insertion guiding portion that extends from an end of the attaching face on its side for insertion of the board, with an inclination along a direction away from the board, the insertion guiding portion restricting insertion of the board to the main body at an angle exceeding a predetermined angle.

According to a preferred embodiment of the inventive board edge connector, the board edge connector further comprises a board mounting terminal that extends laterally from the cover member to be fixed to the mount board.

According to a preferred embodiment of the inventive board edge connector, the board edge connector further comprises a connecting portion formed as a projection in a face of the attaching portion to be attached to the base portion, the connecting portion coming into contact with a pattern formed on the board.

According to a preferred embodiment of the inventive board edge connector, the board edge connector comprises:

a main body; and a plurality of contacts arranged in juxtaposition on the main body along a direction perpendicular to an insertion direction of a board;

wherein the contacts include contact portions projecting from the upper face of the main body; and the main body includes a convex portion formed as a projection from its upper face, the convex portion restricting insertion of the board to the main body at an angle exceeding a predetermined angle.

According to a preferred embodiment of the inventive board edge connector above, the convex portion has a height greater than a projecting height of the contact portion.

According to a preferred embodiment of the inventive board edge connector above, the convex portion includes a guiding face for guiding upwards the board which was inserted at an angle smaller than a predetermined angle.

According to a preferred embodiment of the inventive board edge connector above, the convex portion is sized to be fitted into a cutout portion provided in the board.

According to a preferred embodiment of the inventive board edge connector above, the convex portion includes a feeding face which comes into contact with an end portion of a cutout portion formed in the board on the downstream side in the insertion direction of the board in order to feed the board to the insertion direction.

According to a preferred embodiment of the inventive board edge connector, the board edge connector comprises:

a main body; and a plurality of contacts arranged in juxtaposition on the main body along a direction perpendicular to an insertion direction of a board;

wherein the contacts include contact portions projecting from the upper face of the main body; and the main body includes an arm portion that extends along a lateral edge of the board assuming the fixed posture; and the arm portion includes a fixed posture retaining portion for retaining the board under the fixed posture, and a withdrawal restricting portion for restricting withdrawal of the board along a direction parallel with the board under the fixed posture.

According to a preferred embodiment of the inventive board edge connector above, the fixed posture retaining portion comes into contact with face of the board upstream relative to the pressing direction; and the withdrawal restricting portion comes into contact with a corner portion formed in the board and restricts displacement of the board along a withdrawal direction.

According to a preferred embodiment of the inventive board edge connector above, the withdrawal restricting portion has an abutment face which is inclined to be located progressively on an inner side as it extends toward its leading end.

According to a preferred embodiment of the inventive board edge connector above, the board edge connector above further comprises an elasticity mechanism which is elastically deformed when coming into contact with a downstream-side face of the board assuming the fixed posture in the pressing direction.

According to one embodiment of a board edge connector relating to the present invention, the board edge connector comprises:

a main body;

a plurality of contacts arranged in juxtaposition on the main body along a direction perpendicular to an insertion direction of a board; and a cover member covering the main body;

wherein the main body includes a base portion on which the multiple contacts are juxtaposed, and a pair of arm portions extending from the base portion along opposed lateral edges of the board which assumes a fixed posture;

the contacts include contact portions projecting from the upper face of the main body;

the cover member includes an attaching portion covering the base portion and a pair of arm members covering lateral faces of the pair of arm portions, the attaching portion having a first board mounting terminal extending laterally to be fixed to the mount board, the first board mounting terminal being provided more downstream in the insertion direction of the board than the contact portions.

According to one preferred embodiment of the inventive board edge connector, each said arm member includes a bottom portion extending inwards, the bottom portion having a second board mounting terminal extending laterally to be fixed to the mount board.

According to one preferred embodiment of the inventive board edge connector, the bottom portion includes an opening restricting portion formed adjacent the second board mounting terminal along outer side faces of the pair of arm portions.

According to one preferred embodiment of the inventive board edge connector, each said arm member includes a folded-back portion extending along a first direction and folded back along the side face of the arm portion, the first direction being perpendicular to the extension direction of the pair of arm portions and being along the side face of the arm portion.

According to one preferred embodiment of the inventive board edge connector, each said arm member includes a folded portion folded in Z-shape.

DETAILED DESCRIPTION OF THE PREFERRED EMBODIMENTS

Next, embodiments of an edge connector relating to the present invention will be described with reference to the accompanying drawings.

Figure 1:
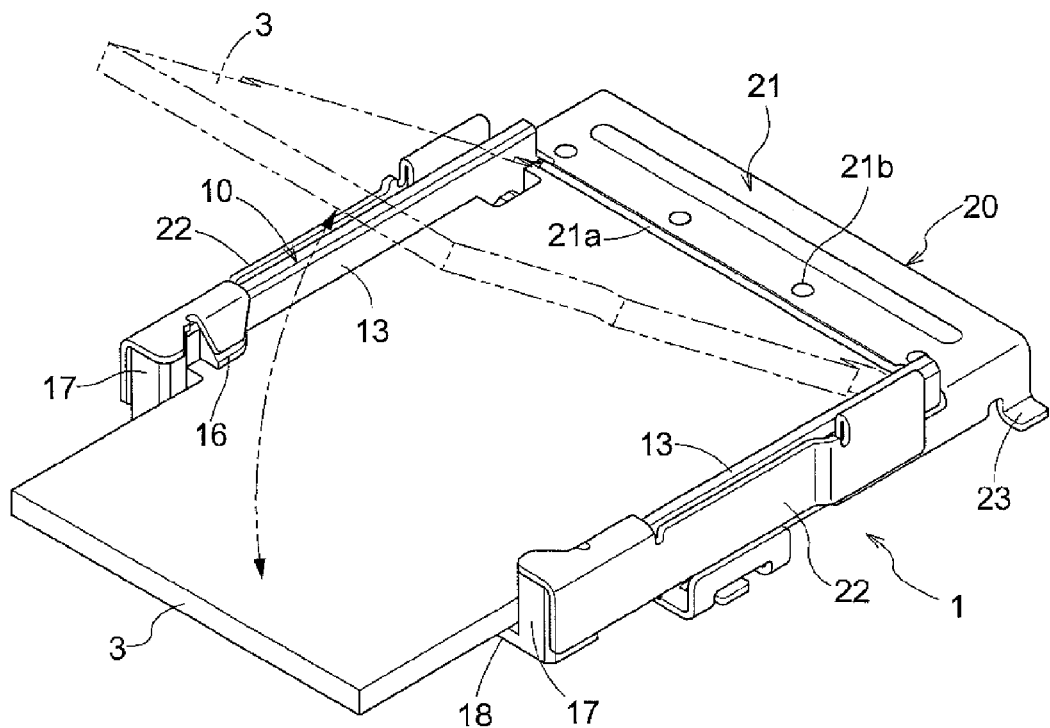
FIG. 1 is a perspective view showing a condition where a board is fixed to an edge connector according to the present invention.
Figure 2:
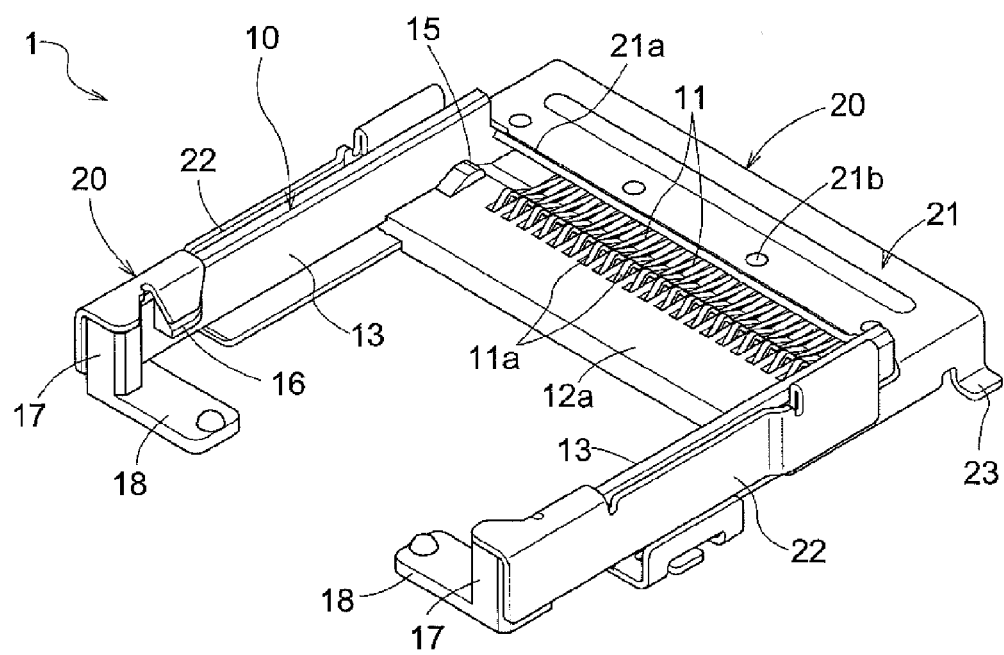
FIG. 2 is a perspective view of the edge connector according to the present invention.
Figure 3:
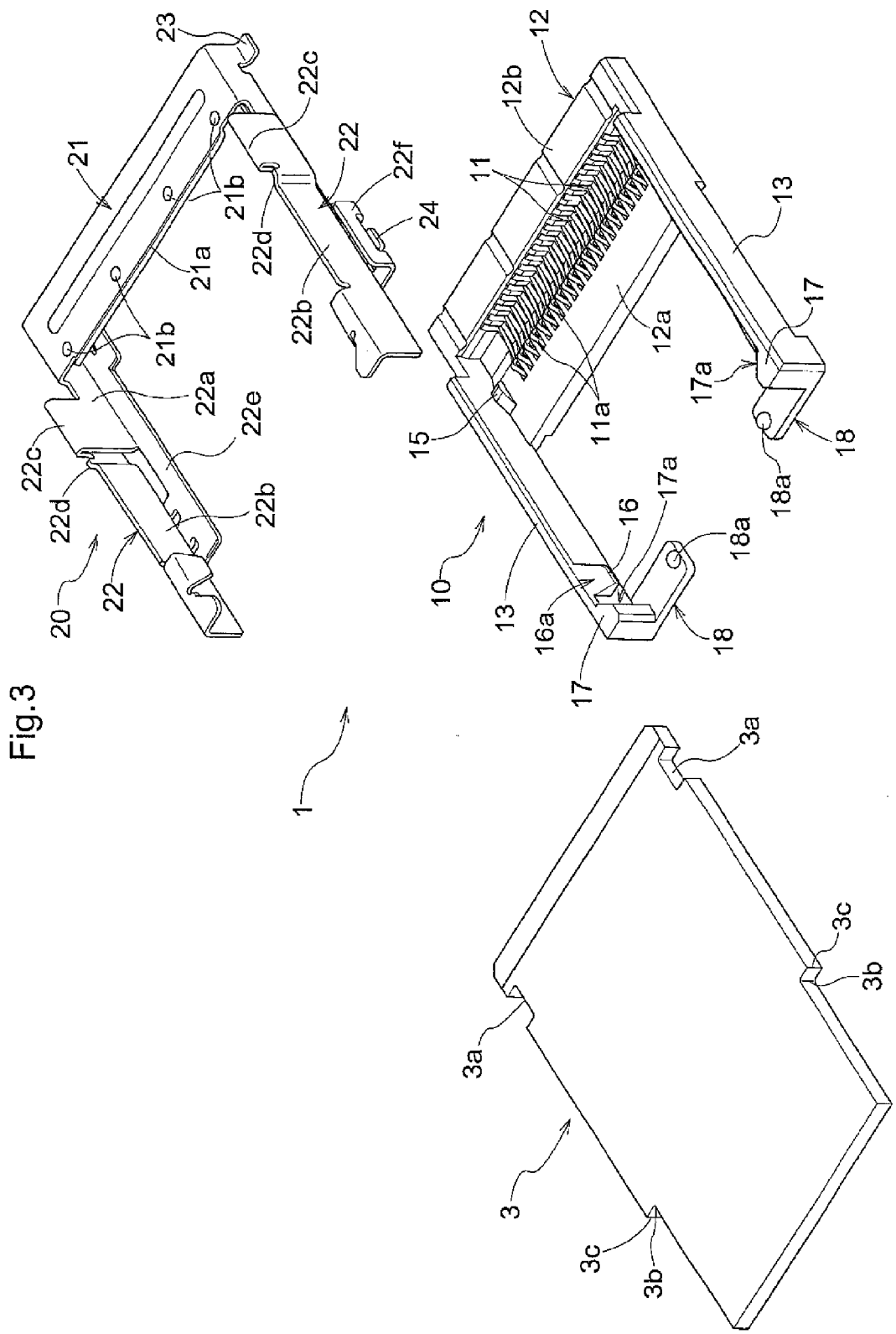
FIG. 3 is an exploded perspective view of the edge connector according to the present invention.

FIGS. 1-3 show an edge connector 1 according to one embodiment of the present invention. To this edge connector 1, a board 3 is to be fixed. The edge connector 1 is fixed to a mount board (not shown). As shown in FIG. 1, the board 3 is inserted along a direction oblique relative to a fixed posture thereof and then pressed to be fixed to be in parallel with the mount board. This posture is referred to as the "fixed posture". Under the above state, electric connection is established between contacts 11 to be described later and a circuit formed on the board 3.

Incidentally, in this detailed description, the mount board side will be referred to as the lower side, the side on which the contacts 11 are formed will be referred to as the rear side and the opposite side along which arm portions 13 extend will be referred to as the forward side, respectively.

In the instant embodiment, the board 3 to be inserted to the edge connector 1 defines cutout portions 3a at the rear opposed lateral faces thereof and defines cutout portions 3b forwardly of the cutout portions 3a. The board 3 is a photoelectric transducer module and photoelectric transducer elements thereof are mounted on the upper face of the board 3.

The edge connector 1 includes a main body 10 formed of an insulating material such as a resin, a plurality of contacts 11 arranged in juxtaposition on the main body 10 and a cover member 20 attached to the main body 10.

The main body 10 includes a base portion 12 and the arm portions 13 extending forwardly from the opposed ends of the base portion 12.

The base portion 12 includes a mounting face 12a which supports the contacts 11 and on which the board 3 is to be mounted and a fixing face 12b to which the cover member 20 is to be attached.

Each contact 11 includes a contact portion 11b which comes into contact with the lower side of the board 3 to be electrically connected therewith and a tail portion 11b (see FIG. 4) to be fixed to the mount board of an electronic appliance.

Figure 4:
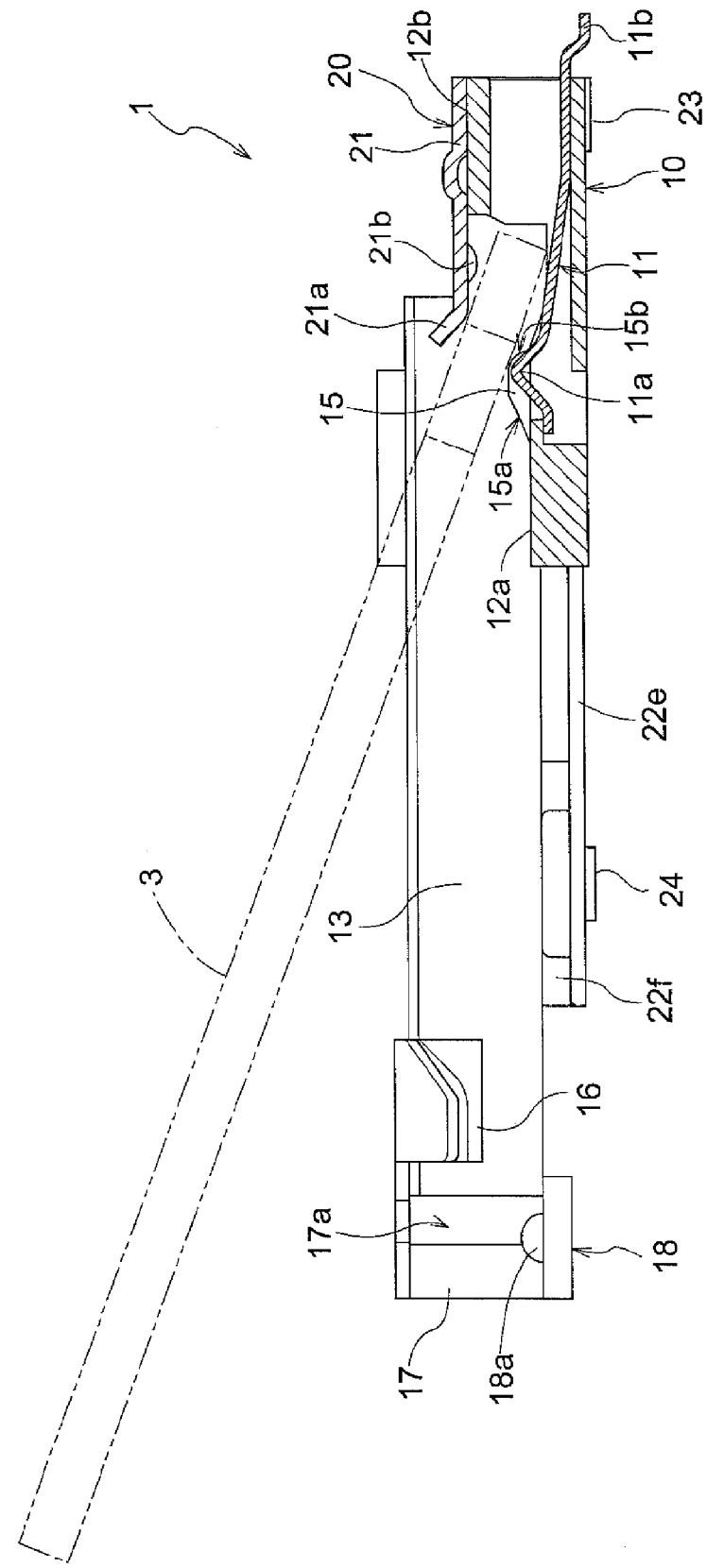
FIG. 4 is a vertical section showing the edge connector according to the present invention.

The contacts 11 are inserted to the base portion 12 from the rear side thereof and juxtaposed along a direction perpendicular to the insertion direction of the board 3. As shown in FIG. 4, the contact portions 11a of the contacts 11 project upward from the mounting face 12a of the base portion 12. Further, the tail portions 11b extend from the rear side of the main body 10 and fixed to the mount board by means of e.g. solder and electrically connected therewith. With this, the board 3 and the mount board can be electrically connected to each other.

At opposed ends of the mounting face 12a of the base portion 12, there are formed a pair of chevron-shaped convex portions 15 on opposed sides of the the contacts 11 therebetween. As shown in FIG. 4, the height of the convex portion 15 as measured from the mounting face 12a is set greater than the projecting height of the contact portion 11a as measured also from the mounting face 12a. Therefore, the contact portions 11a of the contacts 11 are not brought into contact with the rear edge of the board 3, whereby damage to the contacts 11 can be prevented.

Figure 5:
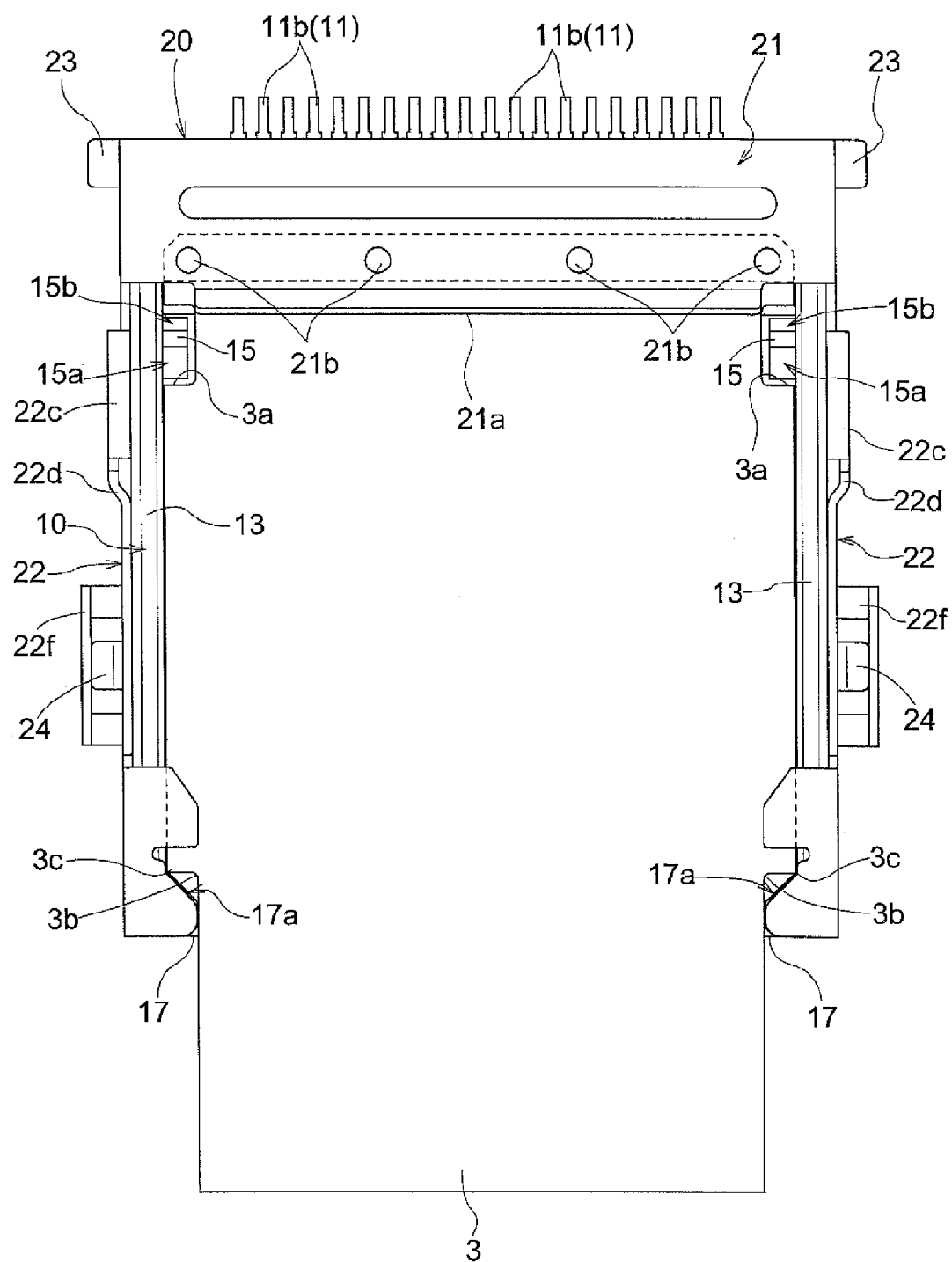
FIG. 5 is a plane view showing the edge connector according to the present invention.

The convex portion 15 includes, at a forward portion thereof, a guiding face 15a formed as an inclined face for upwardly guiding the rear edge of the board 3 at the time of contact of this rear edge of the board 3 therewith and further includes, at a rear portion thereof, a feeding face 15b. The feeding face 15b is formed as an inclined face for rearwardly (the insertion direction) feeding the board 3 when a lower edge at the rear end of the cutout portion 3a of the board 3 comes into contact with the corresponding convex portion 15 at the time of pressing the board 3 into its fixed posture. The feeding face 15b has a greater angle of inclination than the guiding face 15a. Further, as shown in FIG. 5, as seen in this plane view, the convex portion 15 has a size to be fitted into the cutout portion 3a defined in the board 3. Therefore, under the fixed posture of the board 3, the cutout portions 3a do not interfere with the convex portions 15, thus not hindering the fixing of the board 3.

The arm portions 13 of the main body 10 extend forwardly from the opposed lateral faces of the base portion 12 to come into contact with the opposed lateral faces of the board 3 from the outer sides thereof for retaining this board 3. Further, each arm portion 13 includes a fixed posture retaining portion 16, a withdrawal restricting portion 17 and an elastic mechanism 18, which project inwards toward the extending leading end.

The fixed posture retaining portion 16 is formed like a pawl projecting inwards from the upper side of the arm portion 13. Under the fixed posture of the board 3, the lower face of the fixed posture retaining portion 16 contacts the lateral end portion of the upper face of the board 3, thereby to maintain the board 3 horizontal, that is, preventing "floating" phenomenon of this board 3. Further, the fixed posture maintaining portion 16 includes a guiding face 16a whose upper surface is formed with a progressively downward inclination toward the inner side, and this guiding face 16a is covered with the inclined face of the cover member 20. With this, when the board 3 is pressed into its fixed posture, the lower face of the board 3 comes into contact with the inclined face of the cover member 20, and the force of this contact is transmitted to the guiding face 16a, so that this pressing force is converted into a force which spreads the corresponding arm portion 13 outwards. Hence, the pressing and fixing operation into the fixed posture can be effected easily.

The withdrawal restricting portion 17 is formed adjacent the forward end of the arm portion 13 to project inwards from its upper end to its lower end. Further, as shown in FIG. 5, this withdrawal restricting portion 17, as seen from its upper side, is formed with such an inclination as the leading end side thereof being located progressively inwards so as to come into contact with a corner portion 3c of the board 3. Under the fixed posture, as the corner portions 3c of the board 3 come into contact with abutment faces 17a, the board 3 is fixed with its forward displacement being restricted. That is, inadvertent withdrawal of the board 3 is restricted. Even if the board 3 is forwardly displaced, the abutment faces 17a come into contact with the corner portions 3c when the arm portions 13 are closed or drawn closer to each other, so that the board 3 can be fed rearwards. Hence, there is no possibility of damage of the board 3 and also the board 3 can be guided to its proper fixing position.

Figure 6:
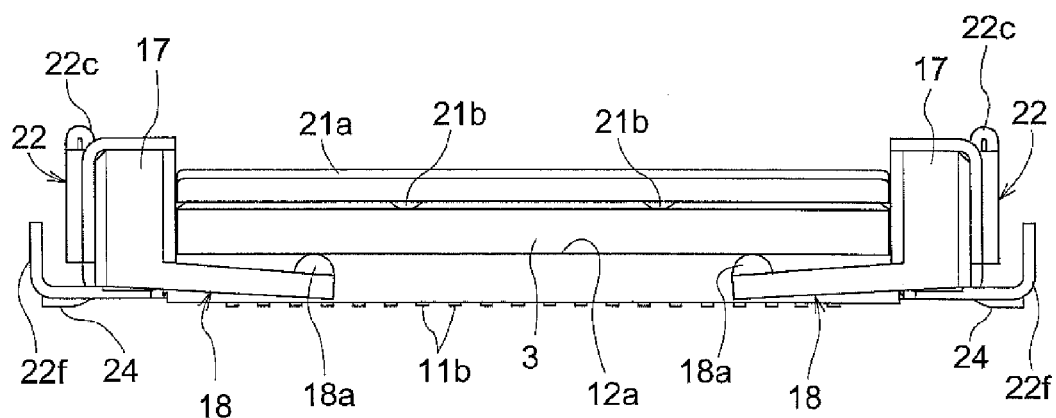
FIG. 6 is a front view of the edge connector according to the present invention.

Further, at the forward end of the arm portion 13, there is provided an elasticity mechanism 18 which extends inwards from the lower face of the arm portion 13. On the upper face of this elasticity mechanism 18, there is formed an abutment portion 18a projecting therefrom. As shown in FIG. 6, as the abutment portion 18a comes into contact with the lower face of the board 3 under its fixed posture, the entire elasticity mechanism 18 is pressed down, thus being elastically deformed. With this, when the arm portions 13 are spread apart to release fixation of the board 3, the elastic resilience of the elasticity mechanisms 18 acts upwards on the board 3, thus being able to assist the reaction forces of the contact portions 11a of the contacts 11.

In the instant embodiment, the elasticity mechanism 18 is formed to extend from the lower face of the withdrawal restricting portion 17, thus securing high strength at the root portion of the elasticity mechanism 18, so that the elasticity thereof will not be easily lost.

The main body 10 is attached with the cover member 20 formed of metal. The cover member 20 includes an attaching portion 21 to be attached to the fixing face 12b of the main body 10, arm members 22 extending forwardly from the attaching portion 21 and covering the arm portions 13 of the main body 10, and first board mounting terminals 23 extending outwards from the lower ends of the rear ends of the attaching portion 21.

The attaching portion 21, as shown in FIG. 4, includes an insertion guiding portion 21a and connecting portions 21b. The insertion guiding portion 21a is formed to extend obliquely upwards from the forward end of the attaching portion 21. As the board 3 is inserted with its upper face being aligned along the lower face of the insertion guiding portion 21a, the board 3 can be guided with its insertion angle being kept below a predetermined angle. The insertion guiding portion 21a of the board 3 could alternatively be provided in the main body 10 of the edge connector 1. In such case, however, a sufficient height would be required of the main body 10 to maintain its required strength. On the other hand, with the provision of the insertion guiding portion 21a in the cover member 21 as proposed in the instant embodiment, the height of the main body 10 can be smaller, so that the entire product can be formed compact.

Figure 7:
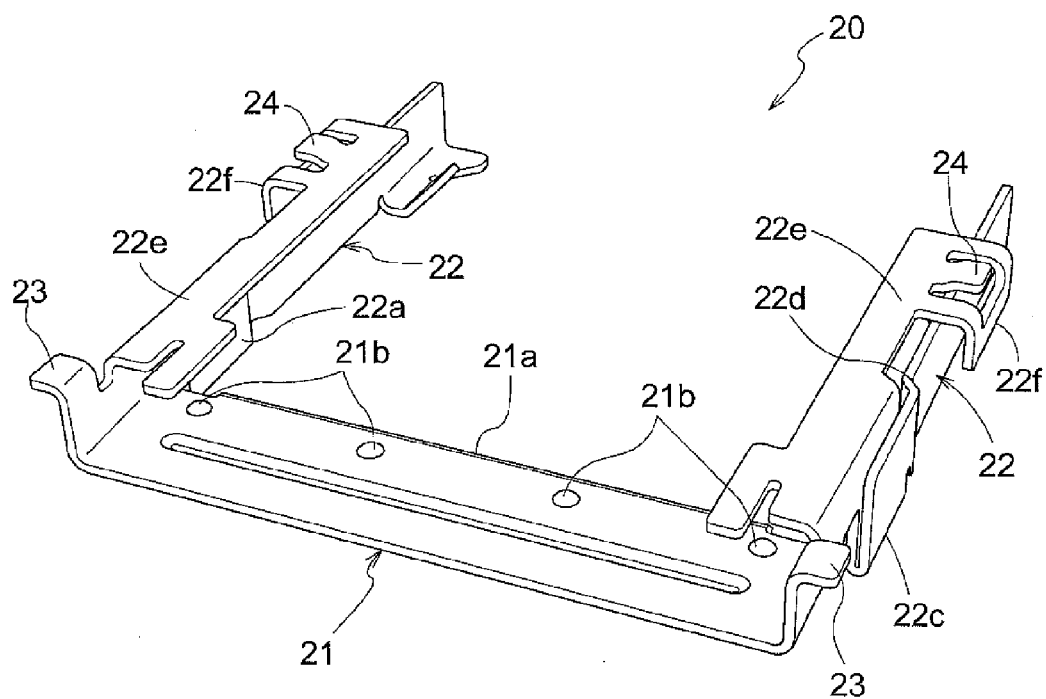
FIG. 7 is a perspective view showing a cover member used in the present invention as seen from below, FIG. 8 are views illustrating a method of inserting a board to the edge connector according to the present invention.

As shown in FIG. 7, the plurality of connecting portions 21b are provided in juxtaposition to project from the lower face of the attaching portion 21. Each one of these connecting portions 21b comes into contact with a pattern (not shown) formed on the upper face of the board 3 as shown in the view in the lower section of FIG. 8 under the board fixed posture to be electrically connected with the board 3. With this, the board 3 can be grounded via the cover member 20. The sole requirement of the connecting portion 21b is its ability to come into contact with the pattern formed on the board 3, hence, it is not limited to its shape and layout disclosed in the instant embodiment.

Next, the arm members 22 of the cover member 20 will be described in details. The pair of arm members 22 are formed integral with the opposed ends of the attaching portion 21 to extend forwardly therefrom. Further, each arm member 22 includes a first lateral wall 22a, a second lateral wall 22b, a folded-back portion 22c, a folded portion 22d, a bottom portion 22e, an opening restricting portion 22f and a second board mounting terminal 24.

The first lateral wall 22a is formed to extend forwardly from the lateral face of the attaching portion 21. And, from a position of thus extended first lateral wall 22a, spaced by a predetermined spacing from the forward end of the attaching portion 21, there is formed the folded-back portion 22c which extends upwards by a predetermined length and folded back outwards by 180 degrees.

As the folded-back portion 22c is formed in the manner described above, it is possible to provide the arm member 22 with high strength. Therefore, the arm portions 13 of the main body 10 will not be spread apart to an extent more than necessary, so that damage to the arm portions 13 can be prevented. Incidentally, it is preferred that the folded-back portion 22c be provided adjacent the attaching portion 21. For, this will prevent application of a force to the base portion 12 in association with opening/closing of the arm portions 13; consequently, inadvertent detachment of the edge connector 1 from the mount board can be effectively prevented.

Further, the arm member 22 includes the second lateral wall 22b extending forwardly from the folded-back portion 22c. And, between the folded-back portion 22c and the second lateral wall 22b, there is formed the folded portion 22d formed in the Z-shape. With these arrangements, the displacements of the arm portion 22 associated with opening/closing of the arm portions 13 take place, with the folded portion 22d acting as a pivot. Accordingly, it is possible to prevent application of an excessive force to the base portion 12 of the main body 10, so that detachment of the tail portions 11b of the contacts 11 of the edge connector 1 from the mount board can be prevented. Further, since the folded-back portion 22c is provided rearwardly adjacent the folded portion 22d, the force generated in association with opening/closing of the arm portions 13 will not affect the folded-back portion 22c formed sturdy. Hence, the force can be absorbed by the folded portion 22d, so that the force to be applied to the base portion 12 can be further alleviated.

The bottom portion 22e of the arm member 22 extends inwards from the lower end of the first lateral wall 22a and extends forwardly. Further, at the forward end of the bottom portion 22e, there is formed the second board mounting terminal 24 that extends obliquely downwards on the outer side to pass under the second lateral wall 22b to be fixed to the mount board. With this, the fixation of the edge connector 1 to the mount board can be further reinforced Adjacent the second mount board terminals 24 at the bottom portions 22e, at positions spaced apart by a predetermined distance from the opposed ends of the second board mounting terminals 24, there are provided the opening restricting portions 22f extending to the outer side to pass under the second lateral walls 22b and folded upwards at positions spaced apart by a predetermined distance from the second lateral walls 22b. The lower faces of these opening restricting portions 22f are located more upwards than the lower faces of the second board mounting terminals 24. When the arm portions 13 are spread open by an angle exceeding a certain angle, the arm portions 22 come into contact with the opening restricting portions 22f, whereby further opening of the arm portions 13 is restricted. Therefore, it is possible to prevent damage to the arm portions 13 and the arm members 22 due to application of an excessive force thereto. Further, since the second board mounting terminals 24 are provided downwardly of the opening restricting portions 22f, even when the arm members 22 come into contact with the opening restricting portions 22f to apply a force thereto, it is still possible to prevent inadvertent detachment of the edge connector 1 from the mount board.

As described above, in the instant embodiment, since the pair of arm members 22 are formed integral via the attaching portion 21, there is no need to separately provide a fixing mechanism for fixing the arm members 22 to the arm portions 13. Therefore, in comparison with an arrangement of providing a pair of arm members 22 separately, the width of the edge connector 1 can be set smaller.

Further, as described above, the cover member 20 is provided with the first board mounting terminals 23. Each first board mounting terminal 23 is formed to extend to the outer side from the lower end of the rear lateral face of the attaching portion 21. Fixing of the edge connector 1 to the mount board is effected by e.g. soldering the tail portions 11b of the contacts 11 to the mount board. However, in case in particular the number of contacts 11 is small, the fixing via the tail portions 11b alone may be unable to provide sufficient strength and when the board 3 inserted obliquely is pressed into its fixed posture, there arises the possibility of detachment of the contacts 11 from the mount board. In view of the above, there are provided the first board mounting terminals 23 and by fixing these to the mount board, the fixation of the edge connector to the mount board can be more stronger. Further, as the first board mounting terminals 23 are provided rearwardly of the contact portions 11a of the contacts 11, it is possible to alleviate the force applied to the tail portions 11b at the time of pressing of the board 3. Consequently, the edge connector 1 can be fixed in an even more effective manner. Further, since the first board mounting terminals 23 are provided in the cover member 20, in comparison with an arrangement of providing these separately, the edge connector 1 can be formed compact and the trouble of attaching the components can be reduced advantageously.

Next, there will be explained a method of inserting and fixing the board 3 to the inventive edge connector 1 and a method of releasing fixation of the board. As shown in the view in the upper section in FIG. 8, when the board 3 is to be inserted to the edge connector 1, the rear end of the lower face of the board 3 is brought into contact with the upper ends of the convex portions 15, whereby the board 3 can be inserted at an angle greater than a predetermined angle. On the other hand, if the board 3 is inserted at a smaller angle, the lower edge of the rear end of the board 3 will come into contact with the convex portions 15 as shown in FIG. 9, so the board 3 cannot be inserted at an angle smaller than the predetermined angle. In this way, insertion of the board 3 at angles smaller than the predetermined angle is restricted, so that contact between the edge of the board 3 with the contacts 11 can be prevented, whereby damage to the contact portions 11a of the contacts 11 can be avoided.

Moreover, if the height of the convex portion 15 is set greater than the height of the contact portions 11a, at whatever angle the edge of the board 3 may come into contact with the convex portions 15, it is ensured that no contact thereof with the contact portions 11a will occur, so that damage to the contact portions 11a of the contacts 11 can be avoided.

Further, as described above, with the mode of insertion operation with the upper edge of the board 3 being brought into contact with the lower face of the insertion guiding portion 21a, it is possible to restrict insertion of the board 3 at an angle greater than a predetermined angle.

Figure 8:
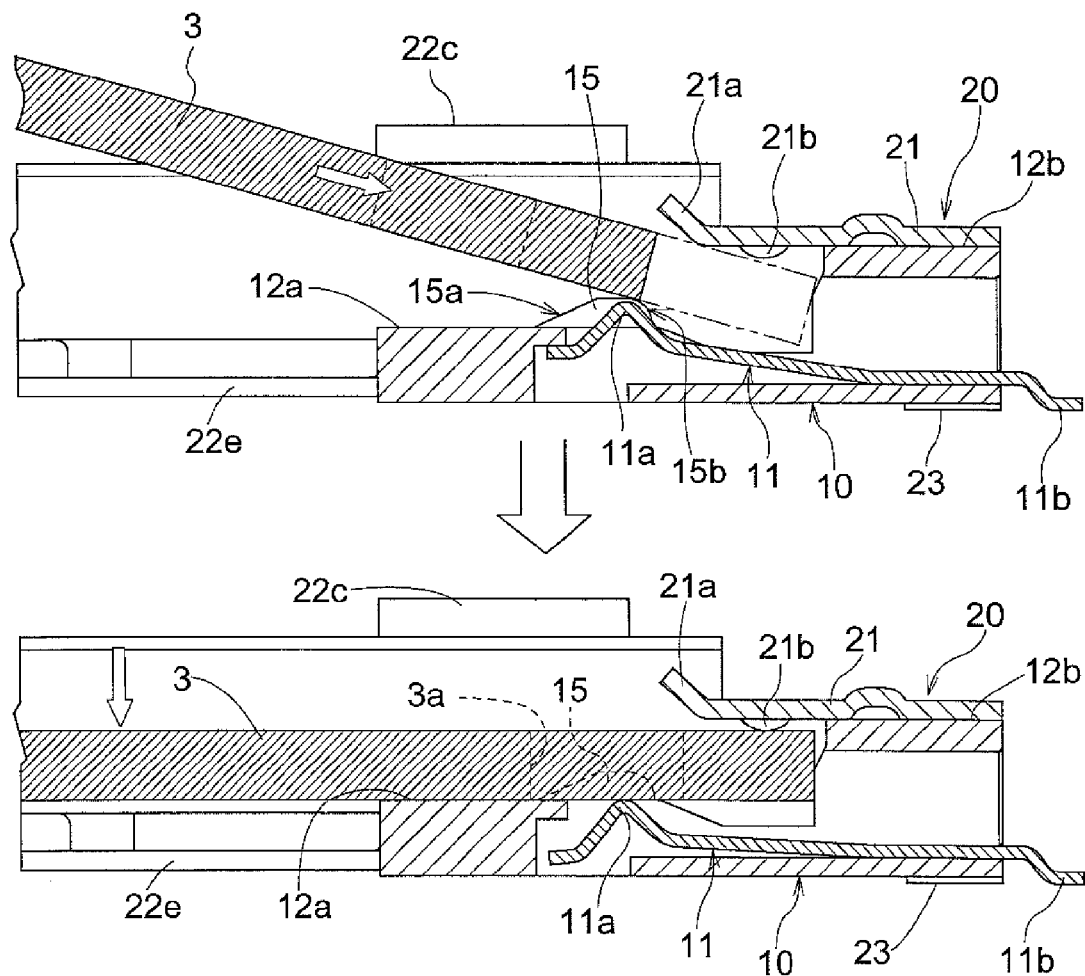
Figure 9:
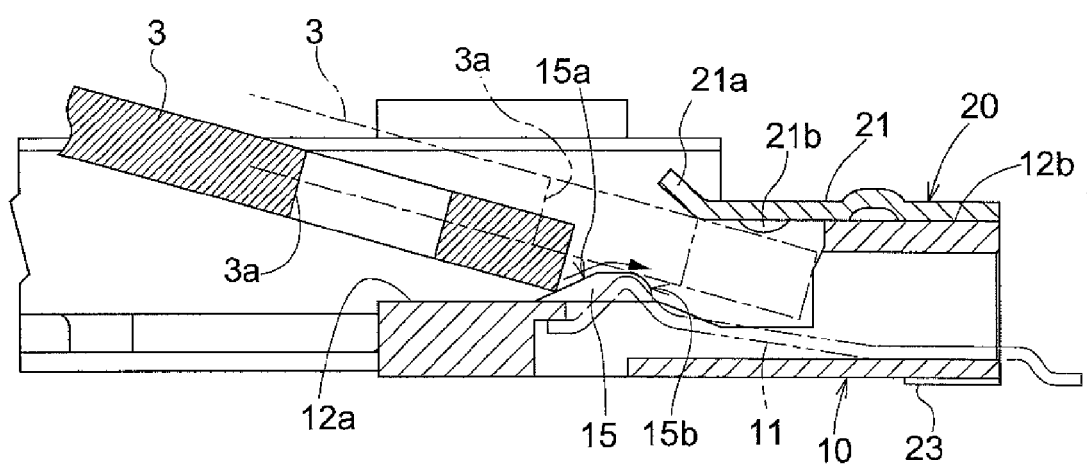
FIG. 9 is s view illustrating relationship between a convex portion of the edge connector according to the present invention and an edge of a board, FIG. 10 are views illustrating a method of fixing a board to the edge connector according to the present invention.
Figure 10:
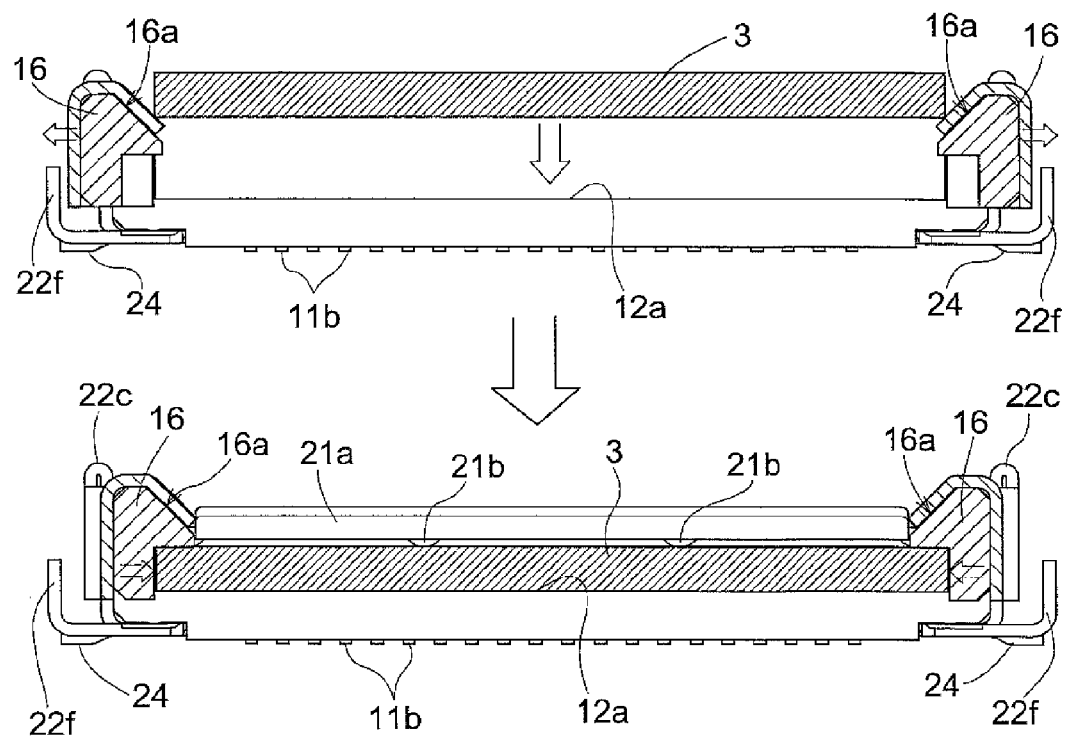

After the board 3 is inserted to a predetermined depth, as shown in the view in the lower part in FIG. 8, the board 3 is pressed down into the fixed posture. In this, as shown in the view in the upper part in FIG. 10, the lower face of the board 3 presses the guide face 16a of the fixed posture retaining portion 16 and the force pressing down the board 3 is converted into a force that spreads open the arm portions 13 to the outer side. Hence, the pressing operation to the fixed posture can be carried out easily. Once the board 3 assumes the fixed posture, as shown in the view in the lower part in FIG. 10, the arm portions 13 will be elastically recovers, whereby the lower face of the fixed posture retaining portion 16 will come into contact with the lateral end of the upper face of the board 3, thereby to fix this board 3 against floating thereof.

As described above, since the fixed posture retaining portion 16 and the withdrawal restricting portion 17 are provided, there occurs no looseness of the board 3 not only in the vertical direction, but also in the forward/rearward direction. Therefore, the board 3 can be fixed to the edge connector 1 in a reliable manner.

Further, under the fixed posture, as shown in FIG. 5, since the size of the convex portion 15 as seen from the above is set to allow fitting thereof into the cutout portion 3a provided in the board 3, no force is applied to this convex portion 15 under the fixed posture of the board 3. Therefore, the function of the convex portion 15 can be effectively maintained and also there occurs no hindrance to the fixed posture of the board 3.

As shown in FIG. 9, if the board 3 is inserted at an angle smaller than a predetermined angle, the lower edge of the rear end face of the board 3 comes into contact with the guiding face 15a of the convex portion 15. As this guiding face 15a has a gentle inclination toward the upper end of the convex portion 15, the board 3 will be guided upward along the guiding face 15a. Accordingly, even when the board 3 is inserted at a small angle, the edge of the board 3 will not come into contact with the contact portions 11a, and the board 3 can be inserted to the predetermined position.

Figure 11:
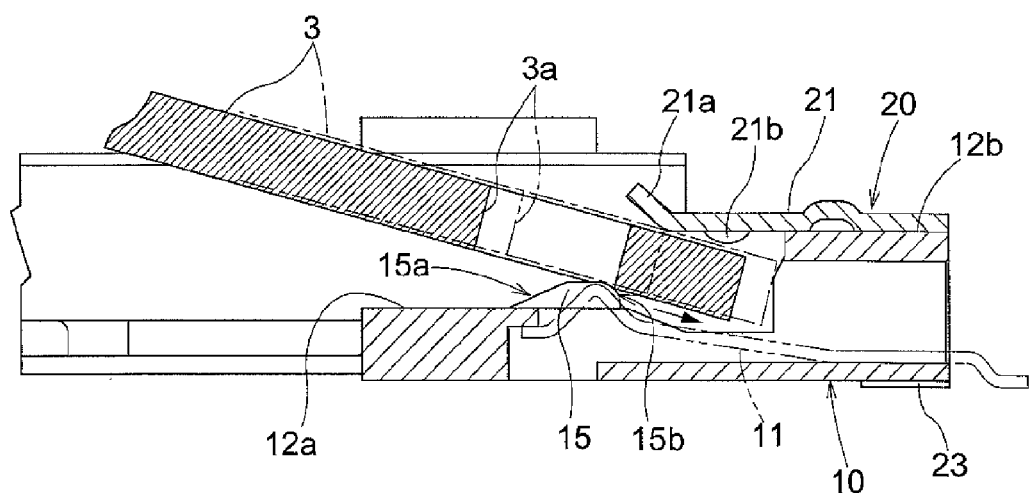
FIG. 11 is a view showing relationship between a convex portion of the edge connector according to the present invention and a corner portion of a board.

Further, as illustrated in FIG. 11, when the board 3 is pressed down into the fixed posture after being inserted along an oblique direction, it may happen that the insertion depth turns out to be insufficient. In such case, the rear lower edge of the cutout portion 3a provided in the board 3 comes into contact with the feeding face 15b. As this feeding face 15b is formed with a sharp inclination rearwards from the upper end of the convex portion 15, the edge of the board 3 placed in contact with the feeding face 15b is fed rearward by the pressing force. Accordingly, the board 3 can be fixed with a proper insertion depth.

Figure 12:
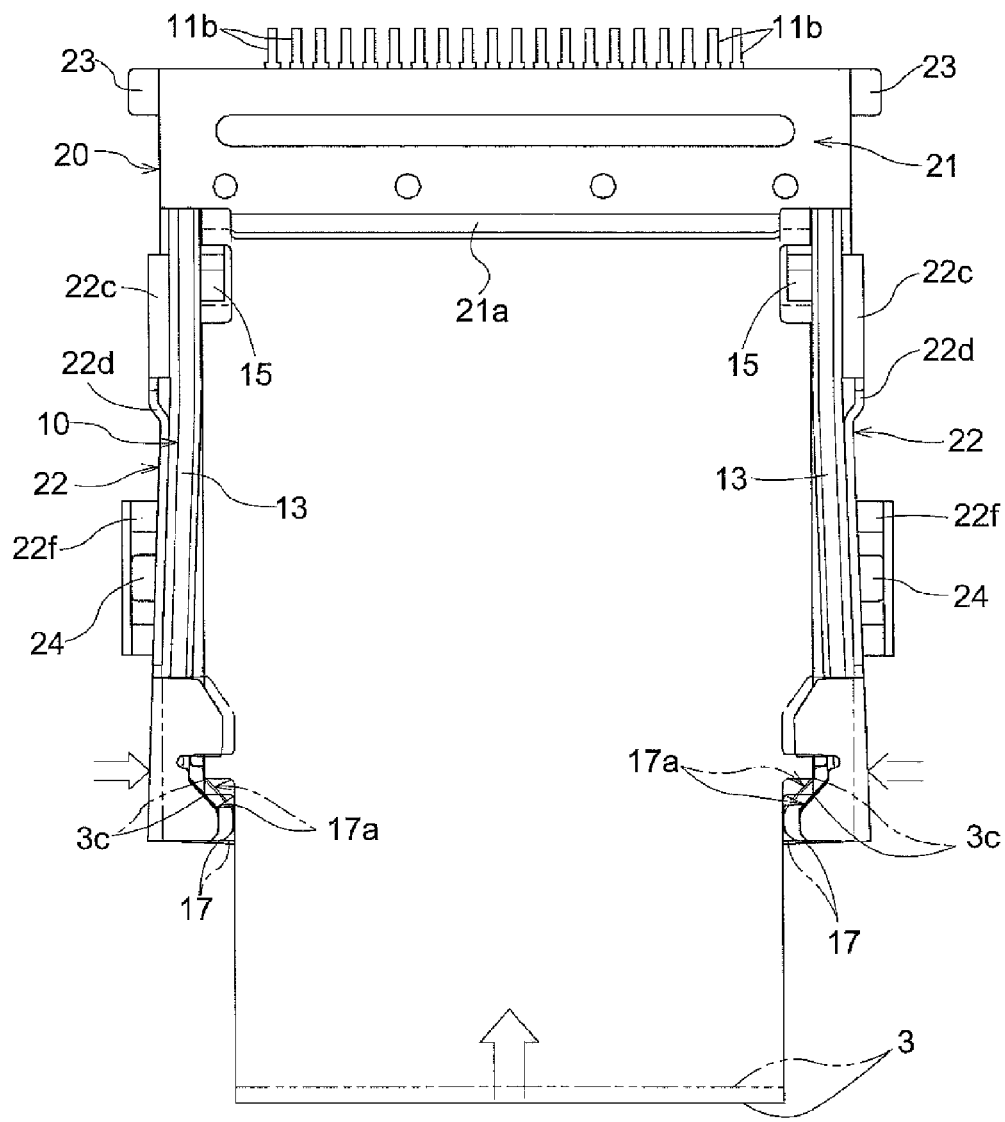
FIG. 12 is a view showing relationship between an abutment face of the edge connector according to the present invention and a corner portion of a board.

Moreover, in case the board 3 has been displaced forwardly, as illustrated in FIG. 12, the abutment face 17a provided in the withdrawal restricting portion 17 of the arm portion 13 will come into contact with the corner portion 3c of the board 3 when the arm portions 13 are closed. Then, the force for closing the arm portions 13 is converted into a force for feeding the board 3 rearward, such that the board 3 will be guided to the appropriate insertion depth.

Fixing of the edge connector 1 to the mount board is effected by means of e.g. soldering of the tail portions 11b of the contacts 11 to the mount board. In this, in the course of pressing of the board 3 into the fixed posture, a force is applied to the edge connector 1. Hence, there arises the possibility that the fixation by the tail portions 11b alone may fail to provide the necessary fixing force, thus inviting detachment of the edge connector 1 from the mount board. However, since the first board mounting terminal 23 is provided in the attaching portion 21 of the cover member 20 and this first board mounting terminal 23 is fixed to the mount board, fixing of the edge connector 1 to the mount board can be more secure. Furthermore, since this first board mounting terminal 23 is provided more rearward than the contact portion 11a of the contact 11, even when a force is applied to the tail portion 11b by the leverage at the time of pressing operation, inadvertent detachment of the edge connector 1 from the mount board can be prevented in a more effective manner.

Under the fixed posture, the multiple connecting portions 21b provided in the cover member 20 come into contact with the pattern formed on the board 3 as illustrated in FIG. 4, electric connection is formed between the board 3 and the cover member 20. With this, the board 3 can be grounded.

Figure 13:
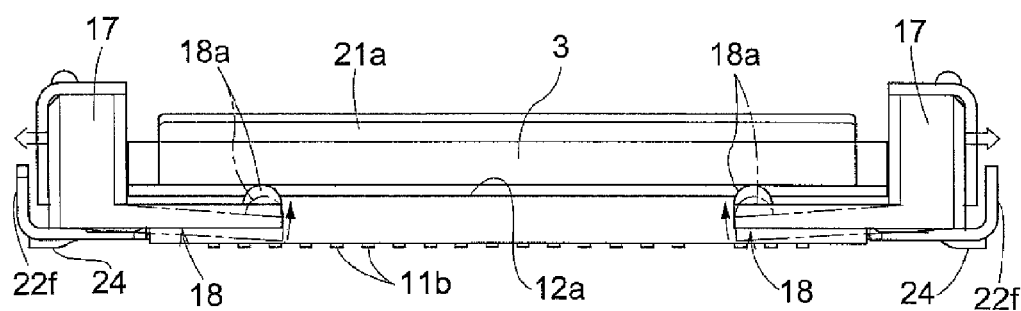
FIG. 13 is a view illustrating a method of releasing a board fixed to the edge connector according to the present invention.

When the fixation of the board 3 is to be released for allowing detachment thereof from the edge connector 1, the arm portions 13 will be spread open from each other to the right and left sides. In the course of this, the upward force from the contact portions 11a of the contacts 11 (the reaction force from the contacts 11) will act on the lower face of the board 3 to displace this board 3 in an oblique direction relative to its fixed posture, whereby the board 3 is withdrawn. In this, as illustrated in FIG. 6, under the fixed posture, the elasticity mechanism 18 of the arm portion 13 is placed in contact with the lower face of the board 3 and is fixed under a downwardly elastically deformed state. Therefore, when the arm portions 13 are spread open to the right and left sides, as shown in FIG. 13, elastic resilience of the elastic mechanism 18 acts on the lower face of the board 3. Accordingly, the reaction force from the contact 11 can be assisted, so that the board 3 can be displaced upwards easily.

In the arm member 22 of the cover member 20, the folded-back portion 22c is formed firmly in the vicinity of the attaching portion 21. Therefore, when the arm portions 13 are spread open, it is possible to prevent the force associated with the opening/closing of the arm portions 13 from being transmitted to the base portion 12. Hence, inadvertent detachment of the edge connector 1 from the mount board can be effectively prevented and also damage to the arm portions 13 can be avoided.

Moreover, in the folded-back portion 22c, its inner wall extends from the attaching portion 21 and the second lateral wall 22b extends from its outer wall. Since the force associated with the opening/closing of the arm portions 13 is transmitted mainly to the second lateral wall 22b, this force is transmitted to the outer wall of the folded-back portion 22c. Accordingly, the force will be transmitted less to the inner wall and the attaching portion 21, so that the base portion 21 is exposed less to a load.

Further, since the opening/closing of the arm portions 13 is effected with the folded portion 22d acting as the pivot therefor, it is possible to prevent inadvertent detachment of the edge connector 1 from the mount board due to application of an excessive force to the base portion 12 of the edge connector 1.

Moreover, since the folded-back portion 22d is provided forwardly adjacent the folded portion 22c, the force associated with the opening/closing of the arm portions 13 can be absorbed by the folded portion 22d. As a result, the force to be applied to the base portion 12 can be further lessened.

As shown in FIG. 13, in the course of spreading of the arm portions 13, if they are spread open by an angle greater than the predetermined angle, the lateral face of the second lateral wall 22b comes into contact with the opening restricting portion 22f. So that, further spreading of the arm portions 13 is restricted. Moreover, the second board mounting terminal 24 is provided downwardly of the opening restricting portion 22f and this second board mounting terminal 24 is fixed to the mount board. Accordingly, even when a force is applied to the opening restricting portion 21f when the arm portion 13 comes into contact with the opening restricting portion 22f, inadvertent detachment of the edge connector 1 from the mount board and damage to the edge connector 1 can be avoided.

OTHER EMBODIMENTS (1) In the foregoing embodiment, the convex portion 15 has a chevron-shape. However, the shape is not limited thereto.

(2) In the foregoing embodiment, the height of the convex portion 15 is set greater than the height of the contact portion 11a. However, the former height may not be greater than the latter height.

(3) In the foregoing embodiment, the convex portion 15 is provided with the guiding face 15a and the feeding face 15b. However, these parts may not be provided.

(4) In the foregoing embodiment, the cover member 20 is provided with the insertion guiding portion 21a. However, this part may not be provided.

(5) In the foregoing embodiment, the cover member 20 is provided with the first board mounting terminal 23 and the second board mounting terminal 24. However, these parts may not be provided.

(6) In the foregoing embodiment, the cover member 20 is provided with the connecting portions 22b. However, these parts may not be provided.

(7) In the foregoing embodiment, the cover member 20 is provided with the opening restricting portion 22f. However, this part may not be provided.

(8) In the foregoing embodiment, the cover member 20 is provided with the folded-back portion 22c and the folded portion 22d. However, these parts may not be provided.

(9) In the foregoing embodiment, the withdrawal restricting portion 17 is formed so as to come into contact with the corner portion 3c of the board 3. However, it may come into contact not with the corner portion.

(10) In the foregoing embodiment, the withdrawal restricting portion 17 is provided with the abutment face 17a. However, this part may not be provided.

(11) In the foregoing embodiment, the arm portion 13 is provided with the elasticity mechanism 18. However, this part may not be provided.

(12) In the foregoing embodiment, the elasticity mechanism 18 is provided with the abutment portion 18a. However, this part may not be provided.

INDUSTRIAL APPLICABILITY

The present invention is applicable to an edge connector to which a board is inserted along an oblique direction.

The invention claimed is:

1. A board edge connector to which a board is inserted along an oblique direction relative to a fixed posture in which the board is pressed and fixed to be in parallel with a mount board, the connector comprising:
   a main body;
   a plurality of contacts arranged on the main body along a direction perpendicular to an insertion direction of the board; and
   a cover member covering the main body;
   wherein the main body includes:
      a base portion and a mounting face extending outwardly from the base portion on which the plurality of contacts are provided along the direction perpendicular to the insertion direction of the board; and
      a pair of arm portions extending from the base portion along opposed lateral edges of the mounting face and the board when the board is positioned in the fixed posture;
   the cover member includes:
      an attaching portion covering the base portion and
      a pair of arm members covering lateral faces of the pair of arm portions, the pair of arm members being formed integral with the attaching portion, wherein the arm members each include an inward bottom portion that continuously extends from the attaching portion to a position proximate an end of each respective arm member that is opposite of the attaching portion and a foldback portion that extends inwardly from an outer surface of the arm portion and is positioned parallel to the arm portion and proximate the attaching portion, and a connecting portion is formed as a projection in a face of the attaching portion to be attached to the base portion.

2. The board edge connector according to claim 1, wherein:
the attaching portion includes an attaching face that covers an upper face of the base portion; and
the attaching portion includes an insertion guiding portion formed to extend from an end of the attaching face on a board insertion side, with an inclination along a direction away from the board, the insertion guiding portion restricting insertion of the board to the main body at an angle exceeding a predetermined angle.

3. The board edge connector according to claim 1, further comprising a board mounting terminal that extends laterally from the cover member to be fixed to the mount board.

4. A board edge connector to which a board is inserted along an oblique direction relative to a fixed posture in which the board is pressed and fixed to be in parallel with a mount board, the connector comprising:
a main body comprising a base portion and a mounting face extending outwardly from the base portion, the mounting face including an upper face and a lower face opposite the upper face; and
a plurality of contacts arranged on the base portion and the mounting face along a direction perpendicular to an insertion direction of a board;
wherein the contacts include contact portions projecting from the upper face of the mounting face;
wherein the mounting face includes a convex portion formed as a projection from the upper face of the mounting face, the convex portion restricting insertion of the board to the main body at an angle exceeding a predetermined angle, and
wherein the convex portion has a height greater than a projecting height of the contact portions,
wherein the convex portion includes an inclined guiding face configured to guide the board upwards relative to the main body, and
wherein the convex portion is sized to be fitted into a cutout portion provided in the board.

5. The board edge connector according to claim 4, wherein the convex portion includes a feeding face which comes into contact with an end portion of a cutout portion formed in the board on the downstream side in the insertion direction of the board in order to feed the board to the insertion direction.

6. A board edge connector to which a board is inserted along an oblique direction relative to a fixed posture in which the board is pressed to be fixed in parallel with a mount board, the connector comprising:
a main body comprising a base portion and a mounting face extending outwardly from the base portion, the mounting face including an upper face and a lower face opposite the upper face; and
a plurality of contacts arranged on the base portion and the mounting face along a direction perpendicular to an insertion direction of the board;
wherein the contacts include contact portions projecting from the upper face of the mounting face;
wherein the main body includes a pair of arm portions that extend along a lateral edge of the mounting face and the board when the board is in the fixed posture, and an elasticity mechanism provided at a distal end portion of each of the pair of arm portions, which is far from the contacts, extending from a lower face of the distal end portion of one of the pair of arm portions toward the other of the pair of arm portions, and elastically deformed when coming into contact with a downstream-side face of the board assuming the fixed posture in a pressing direction, the elasticity mechanism including an abutment portion projecting from an upper face of the elasticity mechanism, the elasticity mechanism coming into contact with the downstream-side face of the board in the pressing direction with the abutment portion; and
wherein each of the arm portions includes:
a fixed posture retaining portion having a guiding face for retaining the board under the fixed posture, and
a withdrawal restricting portion having an abutment face for restricting withdrawal of the board along a direction parallel with the board under the fixed posture.

7. The board edge connector according to claim 6, wherein the fixed posture retaining portion comes into contact with face of the board upstream relative to the pressing direction; and
the withdrawal restricting portion comes into contact with a corner portion formed in the board and restricts displacement of the board along a withdrawal direction.

8. The board edge connector according to claim 7, wherein the abutment face of the withdrawal restricting portion is inclined to be located progressively on an inner side as the abutment face extends toward a leading end.

9. A board edge connector to which a board is inserted along an oblique direction relative to a fixed posture in which the board is pressed and fixed to be in parallel with a mount board, the connector comprising:
a main body and a mounting face extending outwardly from the base portion, the mounting face including an upper face and a lower face opposite the upper face;
a plurality of contacts arranged on the base portion and the mounting face along a direction perpendicular to an insertion direction of a board; and
a cover member covering the main body;
wherein the main body includes:
a base portion and a mounting face extending outwardly from the base portion on which the plurality of contacts are provided along the direction perpendicular to the insertion direction of the board, the mounting face including an upper face and a lower face opposite the upper face, and
a pair of arm portions extending from the base portion along opposed lateral edges of the mounting face and the board which assumes the fixed posture;
wherein the contacts include contact portions projecting from an upper face of the mounting face;
wherein the cover member includes:
an attaching portion covering the base portion; and
a pair of arm members covering lateral faces of the pair of arm portions, the attaching portion having a first board mounting terminal extending laterally to be fixed to the mount board, the first board mounting terminal being provided on a side closer to the base portion than the contact portions,
wherein each said arm member includes a bottom portion extending inwards, the bottom portion having a second board mounting terminal extending laterally to be fixed to the mount board, and wherein the bottom portion includes an opening restricting portion formed adjacent the second board mounting terminal along outer side faces of the pair of arm portions, and wherein the opening restricting portion is folded upwards from the bottom portion to be provided vertically above the second board mounting terminal.

10. The board edge connector according to claim 9, wherein each said arm member includes a folded-back portion extending along a first direction and folded back along the side face of the arm portion, the first direction being perpendicular to an extension direction of the pair of arm portions and being along the side face of the arm portion.

11. The board edge connector according to claim 9, wherein each said arm member includes a folded portion folded in Z-shape.

* * * * *